US012614838B2

(12) United States Patent
Hsu et al.

(10) Patent No.: US 12,614,838 B2
(45) Date of Patent: Apr. 28, 2026

(54) WEARABLE DEVICE

(71) Applicant: Huawei Technologies Co., Ltd., Shenzhen (CN)

(72) Inventors: Chih-Wei Hsu, Taipei (CN); Hanyang Wang, Reading (GB); Bing Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 17/926,795

(22) PCT Filed: Apr. 9, 2021

(86) PCT No.: PCT/CN2021/086238
§ 371 (c)(1),
(2) Date: Nov. 21, 2022

(87) PCT Pub. No.: WO2021/232994
PCT Pub. Date: Nov. 25, 2021

(65) Prior Publication Data

US 2023/0208015 A1 Jun. 29, 2023

(30) Foreign Application Priority Data

May 19, 2020 (CN) ........................ 202010424295.0

(51) Int. Cl.
*H01Q 1/27* (2006.01)
*H01Q 5/25* (2015.01)

(52) U.S. Cl.
CPC ............... *H01Q 1/273* (2013.01); *H01Q 5/25* (2015.01)

(58) Field of Classification Search
CPC ........... H01Q 1/273; H01Q 5/25; H01Q 5/10; H01Q 5/357; H01Q 13/10; H01Q 1/38;
(Continued)

(56) References Cited

U.S. PATENT DOCUMENTS

2015/0255855 A1 9/2015 Tsai et al.
2016/0064804 A1* 3/2016 Kim ...................... H01Q 1/273 343/702
(Continued)

FOREIGN PATENT DOCUMENTS

CN 104009282 A 8/2014
CN 105785757 A 7/2016
(Continued)

*Primary Examiner* — Dameon E Levi
*Assistant Examiner* — Michael M Bouizza
(74) *Attorney, Agent, or Firm* — Conley Rose, P.C.

(57) ABSTRACT

A wearable device includes a metal frame, a printed circuit board PCB, and a first feeding element, where a slot is formed between the metal frame and the PCB. The metal frame includes a first feed point, a first ground point, and a second ground point, and the metal frame is grounded at the first ground point and the second ground point. The metal frame is divided into a first area and a second area by the first ground point and the second ground point, and a circumferential length corresponding to the first area is greater than a circumferential length corresponding to the second area. The first feed point is disposed in the first area, and a distance between the first feed point and the first ground point along the metal frame is less than one third of the circumferential length corresponding to the first area.

21 Claims, 8 Drawing Sheets

(58) Field of Classification Search
CPC .. H01Q 1/36; H01Q 1/48; H01Q 1/50; H01Q 5/50; G04R 60/10
See application file for complete search history.

(56) References Cited

U.S. PATENT DOCUMENTS

| | | | | |
|---|---|---|---|---|
| 2017/0141462 | A1 | 5/2017 | Lin et al. | |
| 2017/0279199 | A1 | 9/2017 | An et al. | |
| 2018/0004247 | A1 * | 1/2018 | Liu | H01Q 13/10 |
| 2018/0062264 | A1 * | 3/2018 | Martinis | H01Q 1/273 |
| 2018/0102588 | A1 | 4/2018 | Szini et al. | |
| 2018/0129170 | A1 | 5/2018 | Yun et al. | |
| 2018/0358704 | A1 | 12/2018 | Liu | |
| 2019/0074586 | A1 * | 3/2019 | Ruaro | H01Q 1/52 |
| 2019/0109367 | A1 * | 4/2019 | Tseng | H01Q 1/273 |
| 2019/0245272 | A1 | 8/2019 | Varjonen et al. | |
| 2020/0106159 | A1 * | 4/2020 | Hsu | H01Q 1/48 |

FOREIGN PATENT DOCUMENTS

| | | | |
|---|---|---|---|
| CN | 106025557 | A | 10/2016 |
| CN | 106571530 | A | 4/2017 |
| CN | 106602247 | A | 4/2017 |
| CN | 106714498 | A | 5/2017 |
| CN | 107230835 | A | 10/2017 |
| CN | 107425292 | A | 12/2017 |
| CN | 107919886 | A | 4/2018 |
| CN | 108288752 | A | 7/2018 |
| CN | 207651666 | U | 7/2018 |
| CN | 109906533 | A | 6/2019 |
| CN | 110137669 | A | 8/2019 |
| CN | 110383578 | A | 10/2019 |
| EP | 3242357 | A1 | 11/2017 |
| EP | 3300170 | A1 | 3/2018 |
| EP | 3454411 | A1 | 3/2019 |
| WO | 2015026527 | A1 | 2/2015 |
| WO | 2016167914 | A1 | 10/2016 |

* cited by examiner

WEARABLE DEVICE

CROSS-REFERENCE TO RELATED APPLICATIONS

This is a U.S. National Stage of International Patent Application No. PCT/CN2021/086238 filed on Apr. 9, 2021, which claims priority to Chinese Patent Application No. 202010424295.0 filed on May 19, 2020, both of which are hereby incorporated by reference in their entireties.

TECHNICAL FIELD

This application relates to the field of wireless communication, and in particular, to a wearable device.

BACKGROUND

With the development of mobile communication technologies, a wearable device can monitor important data such as heartbeats and a sleep status of a human body at any time, and connect to the Internet by using a communication function, to complete data synchronization. Alternatively, the wearable device can obtain information such as a weather temperature. In addition, a built-in near field communication (near field communication, NFC) function enables a user to conveniently and easily consume by using the wearable device.

An important application of the foregoing wearable device cannot be implemented without the communication function, and a built-in antenna is required to transmit or receive electromagnetic signals. Currently, antenna forms such as a monopole antenna or an inverted-F antenna (inverted-F antenna, IFA) are generally used, and the antenna is placed around a printed circuit board (printed circuit board, PCB). Limited by a size of the wearable device (for example, a smartwatch), it is difficult for the built-in antenna of the wearable device to support all frequency bands in a fourth generation (fourth generation, 4G) mobile communication system.

SUMMARY

Embodiments of this application provide a wearable device. According to a slot antenna theory, a metal frame of the wearable device can be used to implement full-frequency band coverage in 4G communication. This provides good communication performance for the wearable device.

According to a first aspect, a wearable device is provided, including a printed circuit board PCB and an antenna structure. The antenna structure includes a metal frame and a first feeding element. A slot is formed between the metal frame and the PCB. The metal frame includes a first feed point, a first ground point, and a second ground point, and the metal frame is grounded at the first ground point and the second ground point. The metal frame is divided into a first area and a second area by the first ground point and the second ground point, and a circumferential length corresponding to the first area is greater than a circumferential length corresponding to the second area. The first feed point is disposed in the first area, and a distance between the first feed point and the first ground point along the metal frame is less than one third of the circumferential length corresponding to the first area. The first feeding element feeds at the first feed point for the antenna structure.

According to this technical solution in this embodiment of this application, the metal frame and the printed circuit board of the wearable device are used to form an antenna structure of the wearable device without increasing structural complexity of the wearable device. In this way, three resonances can be generated to cover all frequency bands in a 4G communication system.

With reference to the first aspect, in some implementations of the first aspect, the antenna structure is a slot antenna.

With reference to the first aspect, in some implementations of the first aspect, when the first feeding element is feeding, the antenna structure generates a first resonance, a second resonance, and a third resonance. A frequency of a resonance point of the first resonance is less than a frequency of a resonance point of the second resonance, and the frequency of the resonance point of the second resonance is less than a frequency of a resonance point of the third resonance.

According to this technical solution in this embodiment of this application, when the first feeding element is feeding, the antenna structure may generate the first resonance, the second resonance, and the third resonance. The first resonance, the second resonance, and the third resonance may respectively correspond to a low band, a middle hand, and a high band in the 4G communication system. When the first resonance is generated, the antenna structure may operate in a half-wavelength mode. When the second resonance is generated, the antenna structure may operate in a one-wavelength mode. When the third resonance is generated, the antenna structure may operate in a three-half-wavelength mode.

With reference to the first aspect, in some implementations of the first aspect, an operating frequency band of the antenna structure corresponding to the second resonance covers a global positioning system GPS frequency band.

According to the technical solution in this embodiment of this application, the second resonance may further cover a global positioning system frequency band, and a positioning antenna is also integrated into the metal frame of the wearable device, to provide a positioning service for the wearable device. This can further reduce complexity of an overall structure.

With reference to the first aspect, in some implementations of the first aspect, an operating frequency band of the antenna structure corresponding to the first resonance covers 698 MHz to 960 MHz, an operating frequency band of the antenna structure corresponding to the second resonance covers 1710 MHz to 2170 MHz, and an operating frequency band of the antenna structure corresponding to the third resonance covers 2300 MHz to 2690 MHz.

According to the technical solution in this embodiment of this application, the first resonance, the second resonance, and the third resonance may respectively correspond to a low band, a middle band, and a high band in the 4G communication system.

With reference to the first aspect, in some implementations of the first aspect, the wearable device further includes a band-pass filter. The metal frame further includes a third ground point, and the third ground point is disposed in the first area and located between the first feed point and the second ground point. One end of the band-pass filter is electrically connected to the metal frame at the third ground point, and the other end is grounded.

According to the technical solution in this embodiment of this application, a resonance point at which the antenna structure generates a resonance may be adjusted.

With reference to the first aspect, in some implementations of the first aspect, an operating frequency band of the band-pass filter covers an operating frequency band of the antenna structure corresponding to the third resonance.

According to the technical solution in this embodiment of this application, when the antenna operates in the operating frequency band corresponding to the third resonance, the band-pass filter may shorten a back-to-ground path of the band-pass filter, to improve radiation performance of the band-pass filter.

With reference to the first aspect, in some implementations of the first aspect, the band-pass filter is capacitive in an operating frequency band of the antenna structure corresponding to the first resonance or in an operating frequency band of the antenna structure corresponding to the second resonance.

According to the technical solution in this embodiment of this application, when the band-pass filter operates in a high band, the band-pass filter is capacitive for a low band and a middle band. Therefore, a capacitor in the band-pass filter may be disposed as an adjustable component, and may be configured to adjust the antenna structure to generate the first resonance and the second resonance to cover resonance points of a low band and a middle band in the 4G mobile communication system.

With reference to the first aspect, in some implementations of the first aspect, the operating frequency band of the band-pass filter covers 2300 MHz to 2690 MHz.

According to the technical solution in this embodiment of this application, the band-pass filter 410 may operate in a high band in the 4G mobile communication system.

With reference to the first aspect, in some implementations of the first aspect, a distance between the third ground point and the first ground point along the metal frame is one third of the circumferential length corresponding to the first area.

According to the technical solution in this embodiment of this application, a back-to-around path of the antenna structure when the antenna structure operates in the three-half-wavelength mode can be effectively shortened. When the antenna structure operates in a high band, interference caused by an environment near the metal frame can be reduced, and a radiation characteristic of the antenna structure when the antenna structure operates in the high band can be increased.

With reference to the first aspect, in some implementations of the first aspect, the circumferential length corresponding to the first area is a half of an operating wavelength corresponding to the resonance point of the first resonance.

According to the technical solution in this embodiment of this application, the circumferential length corresponding to the first area is a half of the operating wavelength corresponding to the resonance point of the first resonance, and a specific value tray be obtained through simulation.

With reference to the first aspect, in some implementations of the first aspect, the circumferential length corresponding to the first area is from 120 mm to 90 mm.

With reference to the first aspect, in some implementations of the first aspect, the circumferential length corresponding to the first area is 112 mm, 102 mm, or 97 mm.

According to the technical solution in this embodiment of this application, for a circular metal frame, when a surface diameter is 46 mm, the circumferential length corresponding to the first area 250 may be 112 mm; when a surface diameter is 42 mm, the circumferential length corresponding to the first area 250 may be 102 mm; or when a surface diameter is 40 mm, the circumferential length corresponding to the first area 250 may be 97 mm.

With reference to the first aspect, in some implementations of the first aspect, a central angle corresponding to the first area is from 288° to 252°.

According to the technical solution in this embodiment of this application, the central angle corresponding to the first area may be from 288° to 252°. A proportion of a radiator of the antenna structure to the metal frame is about 0.7 to 0.8.

With reference to the first aspect, in some implementations of the first aspect, the first area is made of a metal material, and the second area is made of a non-metal material.

According to the technical solution in this embodiment of this application, a slot between the second area and the PCB may be used to implement an electrical connection between a display of the wearable device and the PCB, or implement an electrical connection between a flexible circuit board and the PCB. Excessive cabling can be avoided, and a loss of the antenna structure can be reduced.

According to a second aspect, a wearable device is provided, including an antenna structure and a printed circuit board PCB. The antenna structure includes a metal frame, a band-pass filter, and a first feeding element, where a slot is formed between the metal frame and the PCB. The metal frame includes a first feed point, a first ground point, and a second ground point, and the metal frame is grounded at the first ground point and the second ground point. The metal frame is divided into a first area and a second area by the first ground point and the second ground point, and a circumferential length corresponding to the first area is greater than a circumferential length corresponding to the second area. The first feed point is disposed in the first area, a distance between the first feed point and the first ground point along the metal frame is less than one third of the circumferential length corresponding to the first area. The first feeding element feeds the antenna structure at the first feed point. The metal frame further includes a third ground point, and the third ground point is disposed in the first area and located between the first feed point and the second ground point. One end of the band-pass filter is electrically connected to the metal frame at the third around point, and the other end is grounded. An operating frequency band of the band-pass filter covers 2300 MHz to 2690 MHz, and a distance between the third ground point and the first ground point along the metal frame is one third of the circumferential length corresponding to the first area.

DESCRIPTION OF EMBODIMENTS

The following describes technical solutions of this application with reference to accompanying drawings.

A wearable device provided in this application may be a portable device that can be integrated into clothes or accessories of a user, has a computing function, and can be connected to a mobile phone and various terminal devices. For example, the wearable device may be a watch, a smart wrist strap, a portable music player, a health monitoring device, a computing or game device, a smartphone, an accessory, or the like. In some embodiments, the wearable device is a watch that can be worn around a wrist of the user.

Figure 1:
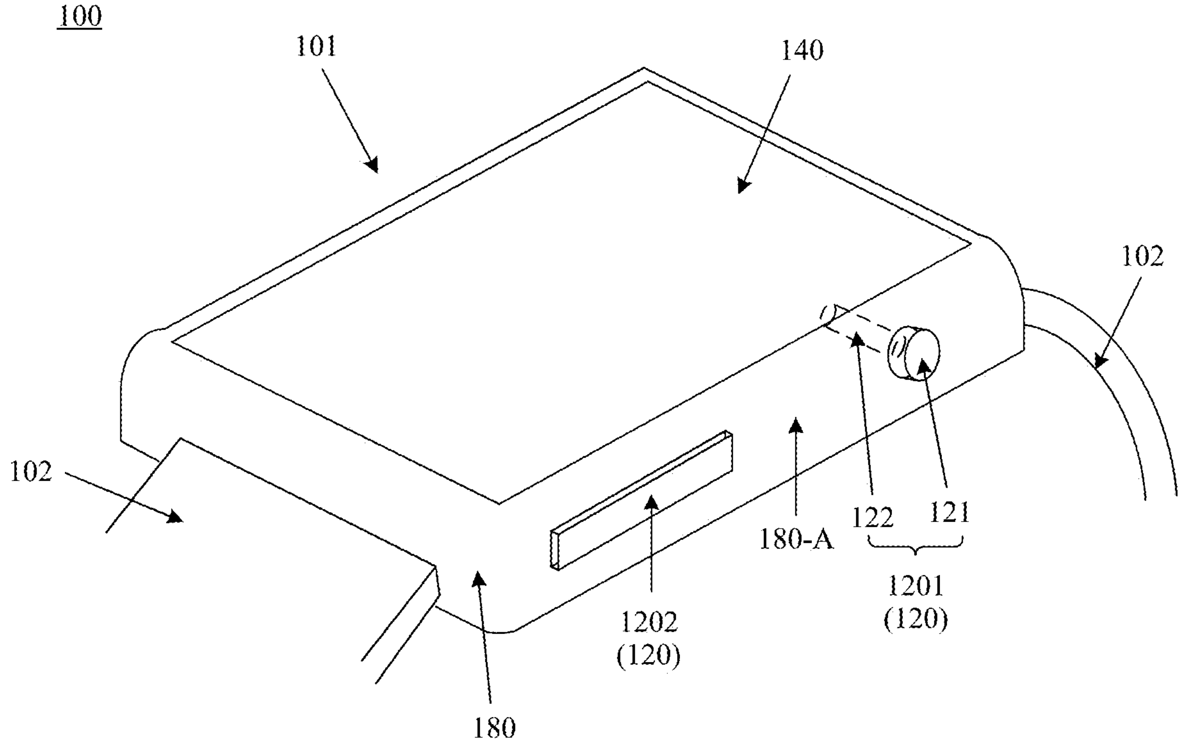
FIG. 1 is a schematic diagram of a wearable device according to an embodiment of this application.

FIG. 1 is a schematic diagram of a structure of a wearable device according to this application. In some embodiments, the wearable device may be a watch or a band.

Refer to FIG. 1. A wearable device 100 includes a main body 101 and one or more wrist straps 102 (FIG. 1 shows a part of an area of the wrist strap 102). The wrist strap 102 is fixedly connected to the main body 101, and the wrist strap 102 may be wound around a wrist, an arm, a leg, or another part of a body, to fasten the wearable device to the body of the user. As a central element of the wearable device 100, the main body 101 may include a metal frame 180 and a display 140. The metal frame 180 may surround the wearable device, and enclose the display 140 as a part of an appearance of the wearable device. Edges of the display 140 are adjacent to and fastened on the middle frame 180, and are formed as a surface of the main body 101. Accommodating space is formed between the metal frame 180 and the display 140, and may accommodate a combination of a plurality of electronic components, to implement various functions of the wearable device 100. The main body 101 further includes an input device 120. The accommodating space between the metal frame 180 and the display 140 may accommodate a part of the input device 120, and an exposed part of the input device 120 is convenient for a user to touch.

It may be understood that a shape of the metal frame 180 of the wearable device in this embodiment of this application may be a circle, a square, a polygon or another regular or irregular pattern. This is not limited herein. For brevity of description, the circular metal frame 180 is used as an example for description in the following embodiments.

As a surface of the main body 101, the display 140 may be used as a protection board of the main body 101, to avoid damage caused by exposure of a component accommodated in the metal frame 180. For example, the display 140 may include a liquid crystal display (liquid crystal display, LCD) and a protection part, and the protection part may be made of a sapphire crystal, glass, plastic, or another material. The protection part of the display may be integrated with the metal frame by using thermoplastic plastic (PC/ABS).

The user may interact with the wearable device 100 by using the display 140. For example, the display 140 may receive an input operation of the user, and make corresponding output in response to the input operation. For example, the user may choose (or in another manner) to open or edit a graph by touching or pressing a position of the graph on the display 140.

The input device 120 is attached to the outside of the metal frame 180 and extends to the inside of the metal frame 180. In some embodiments, the input device includes a head 121 and a rod part 122 that are connected. The rod part 122 extends into the housing 180, and the head 121 is exposed outside the housing 180, and may be used as a part in contact with the user, to allow the user to touch the input device, and receive an input operation of the user by rotating, translating, tilting, or pressing the head 121. When the user operates the head 121, the rod part 122 may move along with the head 121. It may be understood that the head 121 may be in any shape. For example, the head 121 may be in a cylindrical shape. It may be understood that the rotatable input device 120 may be referred to as a button. In an embodiment in which the wearable device 100 is a watch, the rotatable input device 120 may form a crown of the watch, and the input device 120 is referred to as a crown.

In this application, a related design is made for the input device 120, and one or more functions are integrated into the input device 120, to improve user experience. This is described in detail below.

It may be understood that the input device 120 is not limited to the structure shown in FIG. 1, and any mechanical part that can receive an input operation of a user may be used as the input device in this application.

The wearable device 100 includes a button 1202. As an example of the input device 120, the wearable device 100 may allow the user to perform an input operation by pressing, moving, or tilting the button 1202. For example, the button 1202 may be mounted on a side surface 180-A of the metal frame 180, a part of the button 1202 is exposed, and the other part extends from the side surface of the metal frame 180 toward the inside of the housing 180 (not shown in the figure). For example, the button 1202 may alternatively be disposed on the head 121 of the button 1201, and a pressing operation may also be performed when a rotation operation is performed. For example, the button 1202 may alternatively be disposed on a top surface on which a display 140 is mounted on the main body 101.

Still refer to FIG. 1, in some other embodiments, the wearable device 100 may include a button 1201 and the button 1202. The button 1201 and the button 1202 may be disposed on a same surface of the metal frame 180, for example, both are disposed on a same side surface of the metal frame 180. Alternatively, the button 1201 and the button 1202 may be disposed on different surfaces of the metal frame 180. This is not limited in this application. It may be understood that the wearable device 100 may include one or more buttons 1202, or may include one or more buttons 1201.

It should be understood that the wearable device cannot be implemented without a communication function, and a built-in antenna is required to transmit or receive an electromagnetic signal. Currently, an antenna form such as a monopole antenna and an IFA is generally used. Limited by a size of the wearable device (for example, a smartwatch), it is difficult for a built-in antenna of the wearable device to support all frequency bands in a 4G mobile communication system.

Embodiments of this application provide an antenna design solution of a wearable device. A metal frame of the wearable device may be used to implement a low band (low band, LB) (698 MHz to 960 MHz), a middle band (middle band, MB) (1710 MHz to 2170 MHz), and a high band (high band, HB) (2300 MHz to 2690 MHz) in the 4G communication system, to provide good communication performance for the wearable device.

Figure 2:
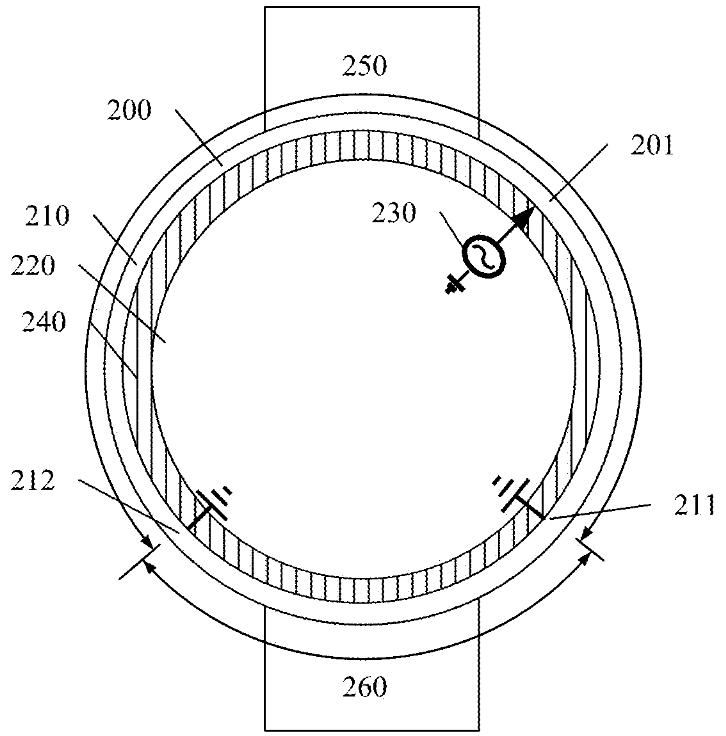
FIG. 2 is a schematic diagram of an antenna structure of a wearable device according to this application.

FIG. 2 is a schematic diagram of an antenna structure of a wearable device according to this application.

As shown in FIG. 2, the wearable device may include a PCB 220 and an antenna structure 200, and the antenna structure may include a metal frame 210 and a first feeding element 230.

A slot 240 is formed between the metal frame 210 and the PCB 220. The metal frame 210 may include a first feed point 201, a first ground point 211, and a second ground point 212. The metal frame 210 may be grounded at the first ground point 211 and the second ground point 212. The metal frame 210 is divided into a first area 250 and a second area 260 by the first ground point 211 and the second ground point 212, and a circumferential length corresponding to the first area 250 is greater than a circumferential length corresponding to the second area 260. The first feed point 201 may be disposed in the first area 250 and close to the first ground point 211. A distance between the first feed point 201 and the first ground point 211 along the metal frame 210 is less than one third of the circumferential length corresponding to the first area 250. The first feeding element 230 feeds the antenna structure at the first feed point 201. The circumferential length corresponding to the first area 250 may be considered as a relatively long distance from the first ground point 211 to the second ground point 212 along a surface of the metal frame 210. The circumferential length corresponding to the second area 260 may be considered as a relatively short distance from the first ground point 211 to the second ground point 212 along the surface of the metal frame 210.

Optionally, the antenna structure 200 may be a slot antenna.

It should be understood that the PCB 220 is formed by press-fitting a plurality of layers of substrates and a metal plating layer exists in the plurality of layers of substrates, and may be used as a ground plane of the antenna structure. The metal frame 210 may be disposed around the PCB 220.

Optionally, the first area 250 of the metal frame 210 may be made of a metal material, and the second area 260 may be made of a non-metal material.

Optionally, the first feeding element 230 may be disposed on the PCB 220, and may be a power chip in the wearable device.

Optionally, the wearable device may further include at least one tuning component, which may be disposed at the first ground point 211 or the second ground point 212, and is configured to adjust an operating frequency of the antenna structure.

Optionally, a central angle corresponding to the first area 250 may be from 288° to 252°. A proportion of a radiator of the antenna structure to the metal frame 210 is about 0.7 to 0.8.

Optionally, the circumferential length corresponding to the first area may be from 120 mm to 90 min.

Optionally, for a circular metal frame, when a surface diameter is 46 mm, the circumferential length corresponding to the first area 250 may be 112 mm; when a surface diameter is 42 mm, the circumferential length corresponding to the first area 250 may be 102 mm, or when a surface diameter is 40 mm, the circumferential length corresponding to the first area 250 may be 97 mm. It should be understood that the circumferential length corresponding to the first area 250 may be adjusted based on a design or simulation. This is not limited in this application.

Optionally, a slot between the second area 260 and the PCB 220 may be used to implement an electrical connection between a display of the wearable device and the PCB 220, or implement an electrical connection between a flexible circuit board (flexible printed circuit, FPC) and the PCB 220. Excessive cabling can be avoided, and a loss of the antenna structure can be reduced.

Figure 3:
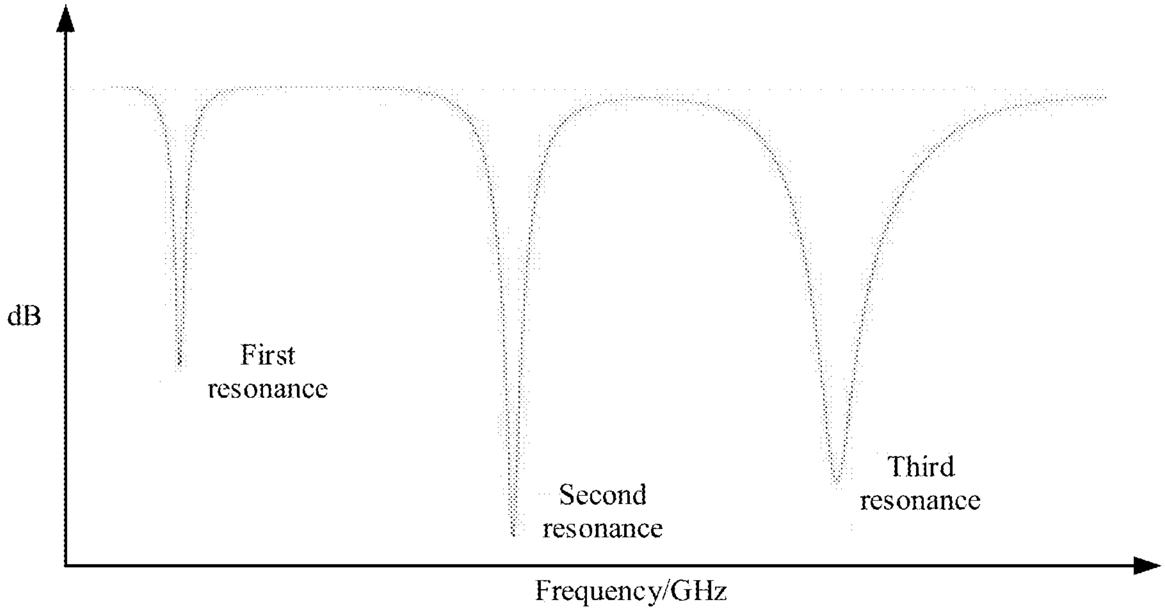
FIG. 3 is an S parameter simulation result of the antenna structure shown in FIG. 2.

FIG. 3 is an S parameter simulation result of the antenna structure shown in FIG. 2.

As shown in FIG. 3, when the first feeding element is feeding, the antenna structure may generate a first resonance, a second resonance, and a third resonance.

The first resonance may be a resonance generated when the antenna structure operates in a half-wavelength mode, and corresponds to the LB in the 4G communication system. The second resonance may be a resonance generated when the antenna structure operates in a one-wavelength mode, and corresponds to the MB in the 4G communication system. The third resonance may be a resonance generated when the antenna structure operates in a three-half-wavelength mode, and corresponds to the HB in the 4G communication system.

It should be understood that the antenna structure provided in the technical solution provided in this embodiment of this application uses a concept of volume multiplex, so that each resonance can fill the antenna structure. A parasitic stub may be further additionally disposed on the basis of this solution, so that a new resonance mode can be excited, and an operating frequency bandwidth of the antenna can be further expanded.

Optionally, the second resonance may further cover a global positioning system (global positioning system, GPS) frequency band, and a positioning antenna is also integrated into the metal frame of the wearable device, to provide a positioning service for the wearable device. This can further reduce complexity of an overall structure.

Optionally, an operating frequency band corresponding to the antenna structure may also cover a frequency band corresponding to a global system of mobile communication (global system of mobile communication, GSM) or code division multiple access (code division multiple access, CDMA), or may cover a frequency band corresponding to a wideband code division multiple access (wideband code division multiple access, WCDMA), a universal mobile telecommunication system (universal mobile telecommunication system UMTS), a worldwide interoperability for microwave access (worldwide interoperability for microwave access, WiMAX) communication system, a general packet radio service (general packet radio service, GPRS), or the like. It should be understood that the technical solution provided in this application may also be applied to 5G communication. This is not limited in this application.

Figure 4:
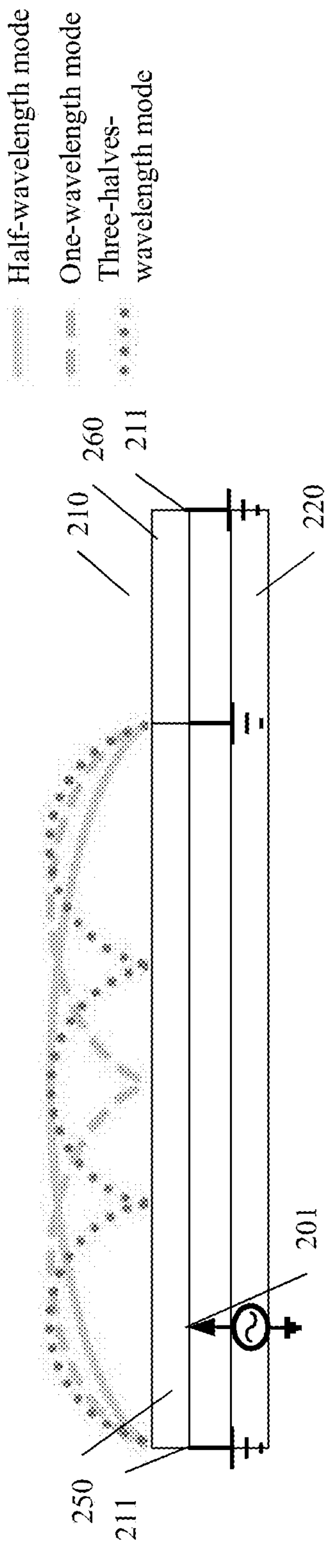
FIG. 4 is a schematic diagram of electric field strength distribution of an antenna structure according to an embodiment of this application.

FIG. 4 is a schematic diagram of electric field strength distribution of an antenna structure according to an embodiment of this application.

As shown in FIG. 2, the metal frame 210 may be expanded from the first ground point 211 to form the structure in FIG. 4. That is, two ends of the metal frame 210 in the structure in FIG. 4 are connected to form a circular structure in FIG. 2.

As shown in FIG. 4, the first feed point 201 may be disposed at a near-ground position, that is, a strong-current area/a weak electric field area of the metal frame. The antenna structure may generate a plurality of resonances that operate in frequency multiplication. For example, the antenna structure may operate in a half-wavelength mode, a one-wavelength mode, a three-half-wavelength mode, a two-wavelength mode, or the like.

Optionally, when the first area 250 of the metal frame 210 is made of a metal material, and the second area 260 is made of a non-metal material, an electronic component may be disposed at a joint between the first area 250 and the second area 260, that is, an electronic component may be further disposed at the first ground point 211, and a resonance point of a resonance generated by the antenna structure is adjusted by capacitance or inductance of the electronic component. For example, an inductor may be disposed at the first ground point 211, one end of the inductor is connected to the metal frame 210 at the first ground point 211, and the other end is grounded, so that the resonance point of the resonance of the antenna structure can be reduced.

Optionally, an electronic component may be disposed at the second ground point 212, so that a resonance point of a resonance generated by the antenna structure may be adjusted. For example, an inductor may be disposed at the second ground point 212, one end of the inductor is connected to the metal frame 210 at the second ground point 212, and the other end is grounded, so that the resonance point of the resonance of the antenna structure can be reduced.

Figure 5:
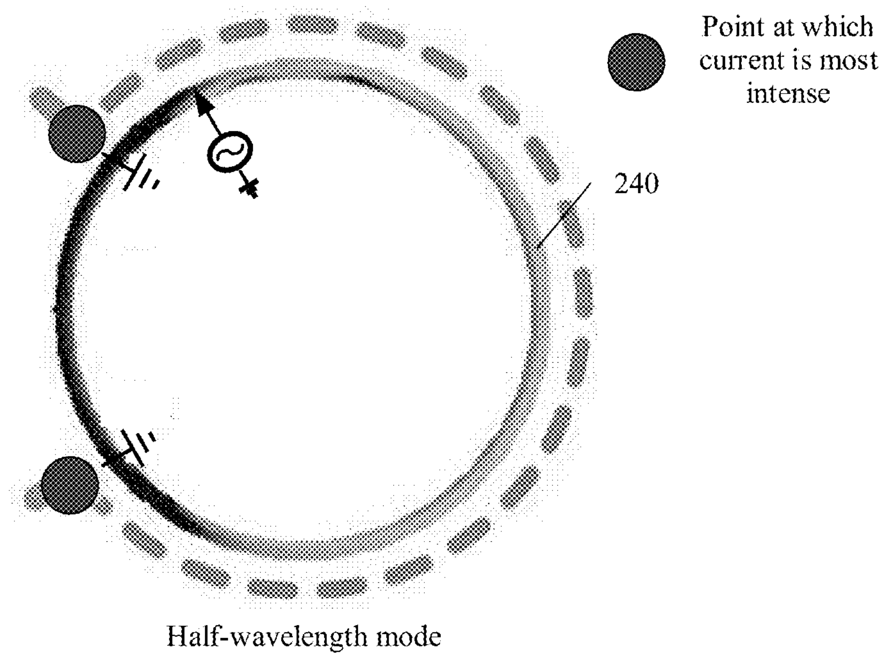
FIG. 5 is a schematic diagram of electric field distribution in a slot when an antenna structure operates in a half-wavelength mode.
Figure 6:
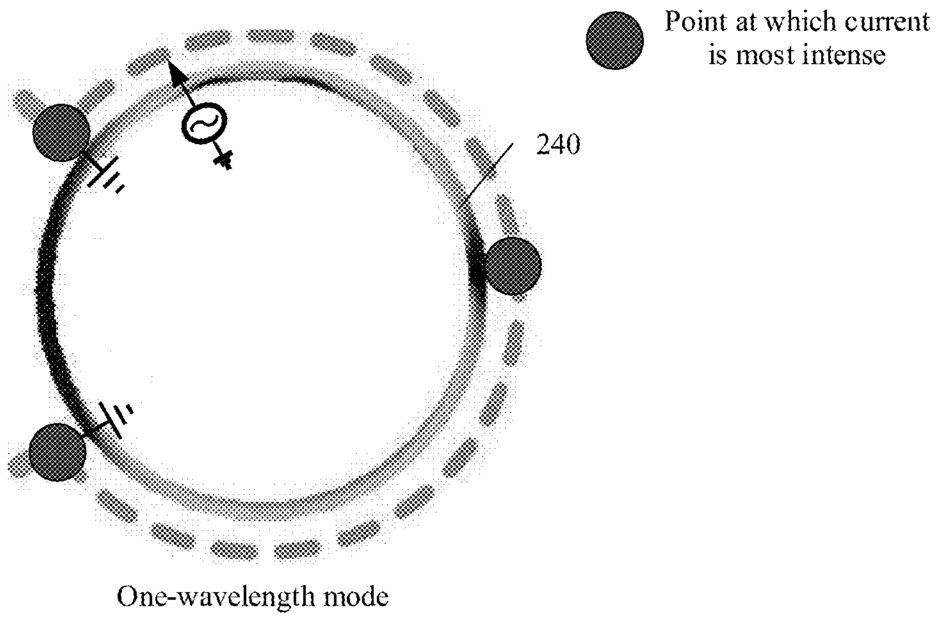
FIG. 6 is a schematic diagram of electric field distribution in a slot when an antenna structure operates in a one-wavelength mode.
Figure 7:
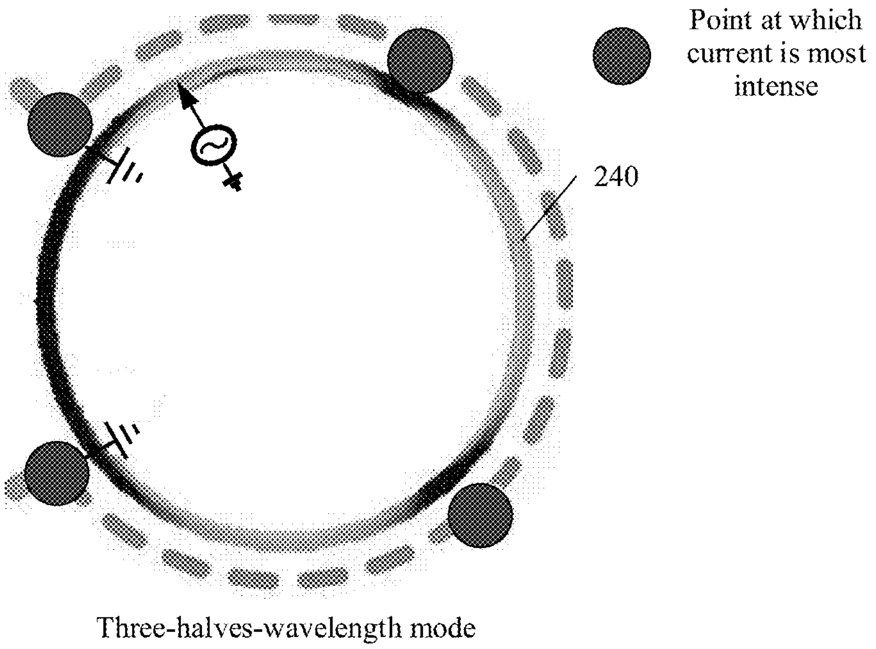
FIG. 7 is a schematic diagram of electric field distribution in a slot when an antenna structure operates in a three-half-wavelength mode.

FIG. 5 to FIG. 7 are schematic diagrams of electric field strength distribution of an antenna structure operating in each mode according to an embodiment of this application. FIG. 5 is a schematic diagram of electric field distribution in a slot when an antenna structure operates in a half-wavelength mode. FIG. 6 is a schematic diagram of electric field distribution in a slot when an antenna structure operates in a one-wavelength mode. FIG. 7 is a schematic diagram of electric field distribution in a slot when an antenna structure operates in a three-half-wavelength mode.

FIG. 5 to FIG. 7 are schematic diagrams of electric field strength distribution on a slot formed between a PCB and a metal frame in each operating mode. A dark-colored area in the figure is a position of an electric field null, and may correspond to a point at which current is most intense on the metal frame.

Optionally, an electronic component, such as a capacitor or an inductor, may be loaded or unloaded at a strong current point corresponding to each mode, and a resonance point of a resonance corresponding to each mode may be fine-tuned.

Figure 8:
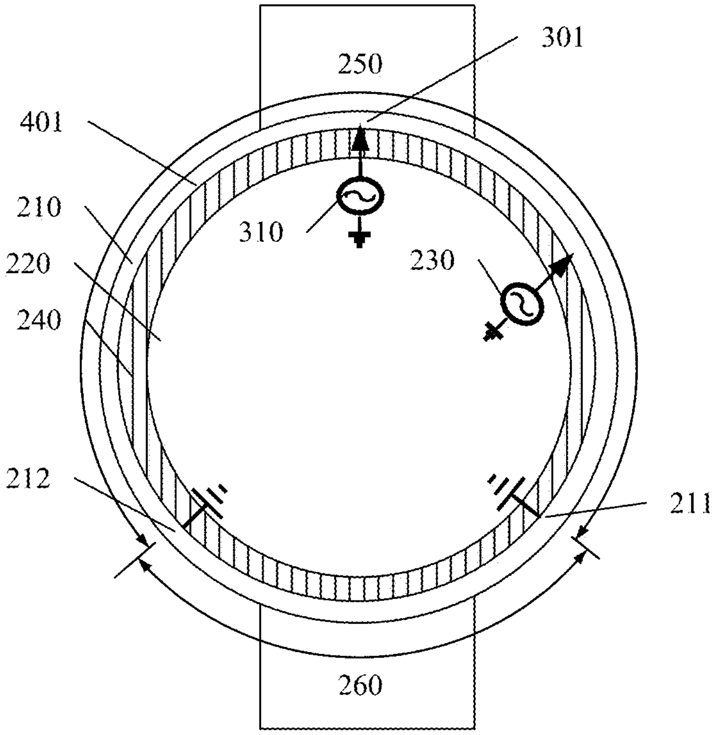
FIG. 8 is a schematic diagram of another antenna structure of a wearable device according to this application.

FIG. 8 is a schematic diagram of another antenna structure of a wearable device according to this application.

As shown in FIG. 8, the wearable device further includes a second feeding element 310. The metal frame 210 may further include a second feed point 301. The second feed point 301 may be disposed in the first area 250, and is located between the first feed point 201 and the second ground point 212. The second feeding element 310 may feeds the antenna structure at the second feed point.

Optionally, a distance between the second feed point 301 and the first ground point 211 along the metal frame 210 is a half of a circumferential length corresponding to the first area 250. That is, as shown in FIG. 4, the second feed point 301 may be disposed at an electric field null in the one-wavelength mode. When the second feeding element 310 feeds at the second feed point 301, the second feeding element 310 may excite a half-wavelength mode and a three-half-wavelength mode of the antenna structure, which correspond to the LB and the HB in the 4G communication system. It should be understood that the wearable device may include a band-pass filter that is configured to generate an MB, so that an operating frequency band of the antenna structure covers the 4G communication system.

Figure 9:
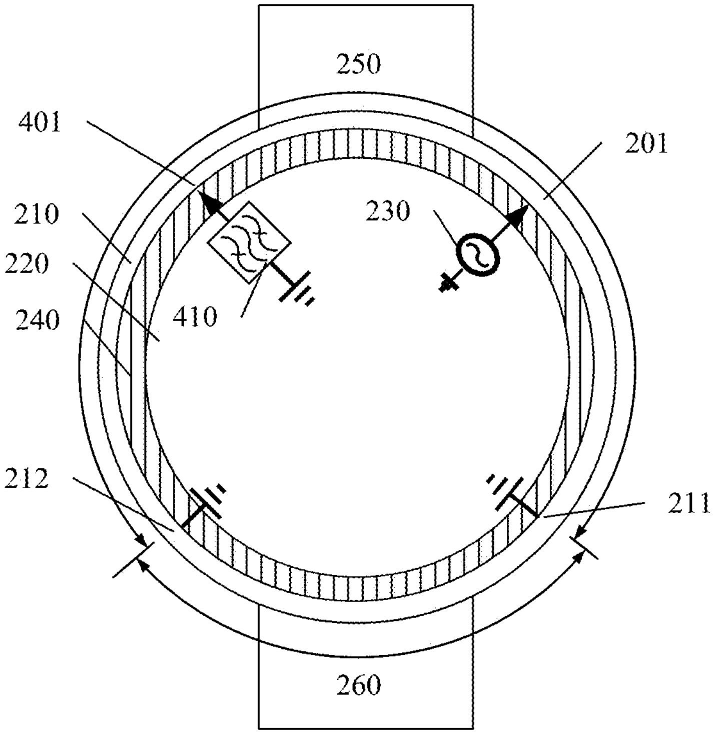
FIG. 9 is a schematic diagram of a structure of a wearable device according to an embodiment of this application.
Figure 10:
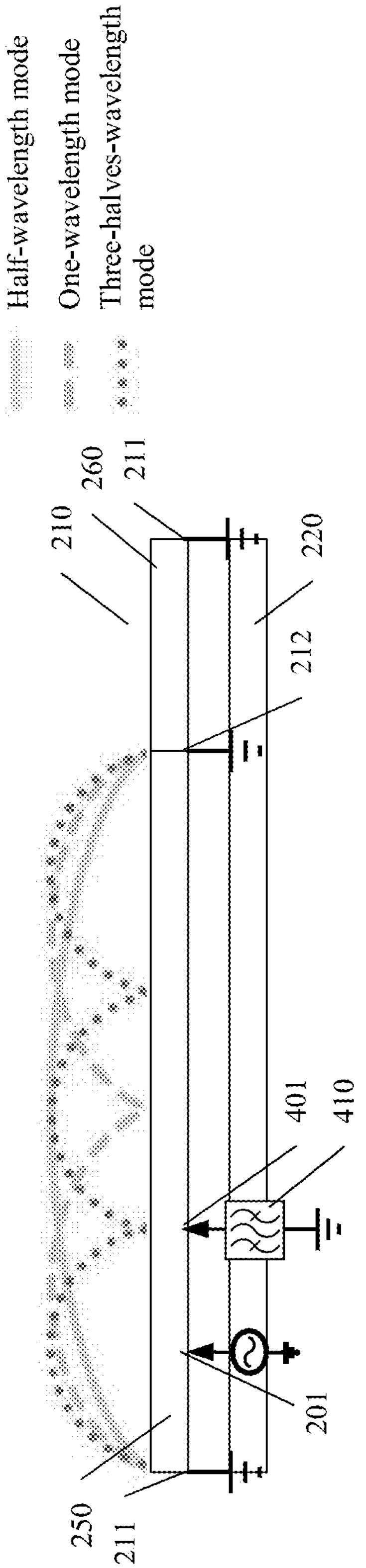
FIG. 10 is a stretch-out view of a metal frame according to an embodiment of this application.

FIG. 9 and FIG. 10 are schematic diagrams of a structure of still another antenna structure of a wearable device according to this application. FIG. 9 is a schematic diagram of a structure of a wearable device according to an embodiment of this application. FIG. 10 is a stretch-out view of a metal frame according to an embodiment of this application.

As shown in FIG. 9, the wearable device further includes a band-pass filter 410.

The metal frame 210 may further include a third ground point 401. The third ground point 401 is disposed in the first area 250, and is located between the first feed point 201 and the second ground point 212. One end of the band-pass filter 410 is electrically connected to the metal frame 210 at the third ground point 401, and the other end is grounded.

Optionally, the band-pass filter 410 may be disposed on the PCB 220, and is electrically connected to the metal frame 210 at the third ground point 401 by using a metal spring plate, Optionally, an operating frequency band of the band-pass filter 410 covers 2300 MHz to 2690 MHz. That is, the band-pass filter 410 may operate in an HB in a 4G mobile communication system.

Optionally, a distance between the third ground point 401 and the first ground point 211 along the metal frame 210 is one third of a circumferential length corresponding to the first area 250. As shown in FIG. 10, the third ground point 401 is a point, at which current is most intense, of an antenna structure when the antenna structure operates in a three-half-wavelength mode. This can effectively shorten a back-to-ground path of the antenna structure when the antenna structure operates in the three-half-wavelength mode, and reduce interference caused by an environment near the metal frame.

Figure 11:
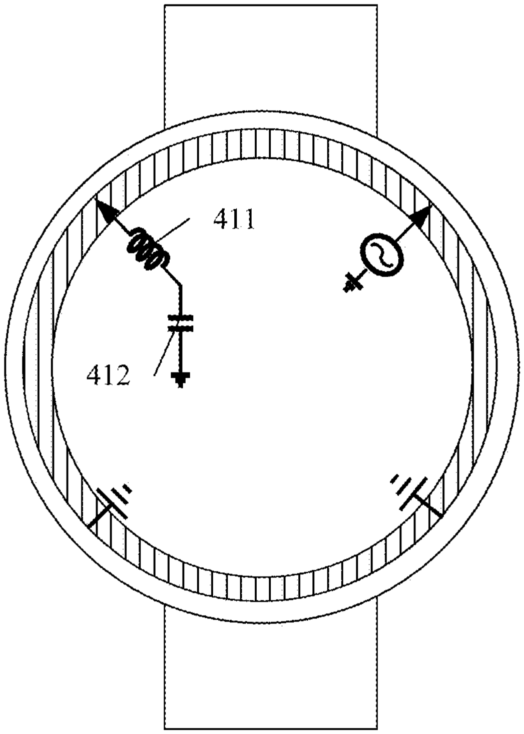
FIG. 11 shows a structure of a band-pass filter according to an embodiment of this application.

FIG. 11 shows a simple band-pass filter structure. It should be understood that a specific form of the band-pass filter is not limited in this embodiment of this application. The band-pass filter may include an inductor 411 and a capacitor 412. Operating at an HB, the band-pass filter is capacitive for an LB and an MB. Therefore, the capacitor 412 may be disposed as an adjustable component, and may be configured to adjust the antenna structure to generate a first resonance and a second resonance to cover resonance points of the LB and the MB in a 4G mobile communication system.

Optionally, the wearable device may further include a switch component that is disposed between the band-pass filter and the third ground point. The switch component may be used to select a corresponding band-pass filter when different resonances are generated by the antenna structure, so that resonance points corresponding to the resonances generated by the antenna structure may be adjusted.

Figure 12:
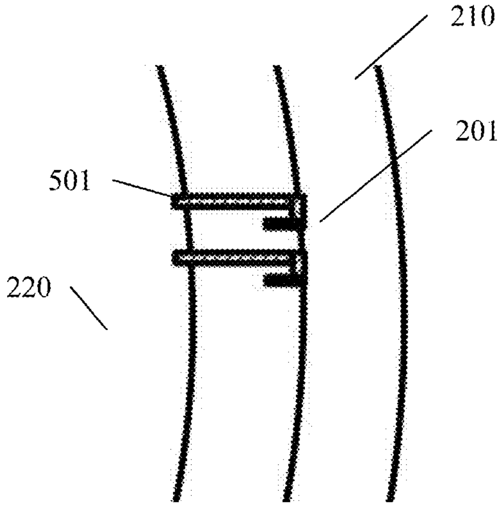
FIG. 12 is a schematic diagram of a structure of a feeding solution of an antenna structure according to an embodiment of this application.

FIG. 12 is a schematic diagram of a structure of a feeding solution of antenna structure according to an embodiment of this application.

As shown in FIG. 12, a feeding element of a wearable device may be disposed on the PCB 220, and is electrically connected to a feed point on the metal frame 210 by using a spring plate 501.

Optionally, the spring plate 501 may be directly electrically connected to each feed point, or may perform coupled feeding. This is not limited in this application.

It should be understood that the technical solution provided in this embodiment of this application may be further applied to a ground structure of an antenna structure, and is connected to a ground plane by using a spring plate. Alternatively, each electronic component on the PCB may be electrically connected to the metal frame by using a spring plate.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wearable device comprising:

a printed circuit board (PCB);

an antenna structure comprising:

a metal frame comprising:

a first feed point;

a first ground point; and a second ground point, wherein the metal frame is divided into a first area and a second area by the first ground point and the second ground point, wherein a first circumferential length of the first area is greater than a second circumferential length of the second area, wherein the first feed point is disposed in the first area, and wherein a first distance between the first feed point and the first ground point along the metal frame is less than one third of the first circumferential length; and a first feeding element configured to feed the antenna structure at the first feed point; and a slot formed between the metal frame and the PCB, wherein the antenna structure is configured to generate a first resonance, a second resonance, and a third resonance when the first feeding element feeds the antenna structure, wherein the first resonance comprises first strong current points corresponding to the first ground point and the second ground point, wherein the second resonance comprises second strong current points corresponding to the first ground point, the second ground point, and a first point between the first ground point and the second ground point, and wherein the third resonance comprises third strong current points corresponding to the first ground point, the second ground point, a second point between the first ground point and the second ground point, and a third point between the first ground point and the second ground point.

2. The wearable device of claim 1, wherein a first frequency of a first resonance point of the first resonance is less than a second frequency of a second resonance point of the second resonance, wherein the second frequency is less than a third frequency of a third resonance point of the third resonance, and wherein the antenna structure is configured to operate in frequency bands corresponding to the first resonance, the second resonance, and the third resonance.

3. The wearable device of claim 2, wherein an operating frequency band of the antenna structure corresponding to the second resonance includes a Global Positioning System (GPS) frequency band.

4. The wearable device of claim 2, wherein a first operating frequency band of the antenna structure corresponding to the first resonance includes a first frequency band of 698 megahertz (MHz) to 960 MHz, wherein a second operating frequency band of the antenna structure corresponding to the second resonance includes a second frequency band of 1710 MHz to 2170 MHz, and wherein a third operating frequency band of the antenna structure corresponding to the third resonance includes a third frequency band of 2300 MHz to 2690 MHz.

5. The wearable device of claim 2, wherein the wearable device further comprises a band-pass filter comprising a first end and a second end, wherein the metal frame further comprises a third ground point disposed in the first area and located between the first feed point and the second ground point, wherein the first end is electrically coupled to the metal frame at the third ground point, and wherein the second end is grounded.

6. The wearable device of claim 5, wherein a first operating frequency band of the band-pass filter includes a second operating frequency band of the antenna structure corresponding to the third resonance.

7. The wearable device of claim 5, wherein the band-pass filter is capacitive in a first operating frequency band of the antenna structure corresponding to the first resonance or in a second operating frequency band of the antenna structure corresponding to the second resonance.

8. The wearable device of claim 5, wherein a second distance between the third ground point and the first ground point along the metal frame is one third of the first circumferential length.

9. The wearable device of claim 2, wherein the first circumferential length is half of an operating wavelength corresponding to the first resonance point of the first resonance.

10. The wearable device of claim 2, wherein the first resonance corresponds to a half-wavelength mode of the first area, wherein the second resonance corresponds to a one-wavelength mode of the first area, and wherein the third resonance corresponds to a three-half-wavelength mode of the first area.

11. The wearable device of claim 1, wherein the first circumferential length is within a range from 120 millimeters (mm) to 90 mm, or wherein the first circumferential length is approximately equal to 112 millimeters (mm), 102 mm, or 97 mm.

12. The wearable device of claim 1, wherein a proportion of the first circumferential length to a length of the metal frame is within a range from 0.7 to 0.8.

13. The wearable device of claim 1, wherein the wearable device further comprises at least one tuning component disposed at the first ground point or the second ground point.

14. The wearable device of claim 1, wherein the first area is composed of a metal material, and wherein the second area is composed of a non-metal material.

15. The wearable device of claim 1, wherein the antenna structure further comprises a second feeding element, wherein the wearable device further comprises a second feed point disposed in the first area and located between the first feed point and the second ground point, and wherein the second feed point is configured to feed the antenna structure at the second feed point.

16. The wearable device of claim 1, wherein the antenna structure is a slot antenna.

17. The wearable device of claim 1, wherein the metal frame comprises a circular metal frame with a continuous outer perimeter, wherein the first area comprises a first portion of the circular metal frame and has a first arc shape, and wherein the second area comprises a second portion of the circular metal frame and has a second arc shape.

18. A wearable device comprising:
- a printed circuit board (PCB);
- an antenna structure comprising:
  - a metal frame comprising:
    - a first feed point;
    - a first ground point; and
    - a second ground point; and
  - a first feeding element configured to feed the antenna structure at the first feed point, and the first feed point is disposed between the first ground point and the second ground point; and
- a slot formed between the metal frame and the PCB,
- wherein the antenna structure is configured to generate a first resonance, a second resonance, and a third resonance when the first feeding element feeds the antenna structure,
- wherein a first frequency of a first resonance point of the first resonance is less than a second frequency of a second resonance point of the second resonance,
- wherein the second frequency is less than a third frequency of a third resonance point of the third resonance,
- wherein the first resonance comprises first strong current points corresponding to the first ground point and the second ground point,
- wherein the second resonance comprises second strong current points corresponding to the first ground point, the second ground point, and a first point between the first ground point and the second ground point, and
- wherein the third resonance comprises third strong current points corresponding to the first ground point, the second ground point, a second point between the first ground point and the second ground point, and a third point between the first ground point and the second ground point.

19. The wearable device of claim 18, wherein the first resonance corresponds to a half-wavelength mode of a first area comprising a first circumferential length between the first ground point and the second ground point, wherein the second resonance corresponds to a one-wavelength mode of the first area, and wherein the third resonance corresponds to a three-half-wavelength mode of the first area.

20. A device comprising:
- a printed circuit board (PCB);
- an antenna structure comprising:
  - a frame comprising:
    - a first feed point;
    - a first ground point; and
    - a second ground point, wherein the frame is divided into a first area and a second area by the first ground point and the second ground point, and wherein a first circumferential length of the first area is greater than a second circumferential length of the second area; and
  - a first feeding element configured to feed the antenna structure at the first feed point; and
- a slot formed between the frame and the PCB,
- wherein the antenna structure is configured to generate a first resonance, a second resonance, and a third resonance when the first feeding element feeds the antenna structure,
- wherein the first resonance comprises first strong current points corresponding to the first ground point and the second ground point,
- wherein the second resonance comprises second strong current points corresponding to the first ground point, the second ground point, and a first point between the first ground point and the second ground point, and
- wherein the third resonance comprises third strong current points corresponding to the first ground point, the second ground point, a second point between the first ground point and the second ground point, and a third point between the first ground point and the second ground point.

21. The device of claim 20, wherein the first feed point is disposed in the first area, wherein a first distance between the first feed point and the first ground point along the frame is less than one third of the first circumferential length, wherein a first frequency of a first resonance point of the first resonance is less than a second frequency of a second resonance point of the second resonance, wherein the second frequency is less than a third frequency of a third resonance point of the third resonance, and wherein the antenna structure is configured to operate in frequency bands corresponding to the first resonance, the second resonance, and the third resonance.

* * * * *